US009838852B2

(12) United States Patent
Mildh et al.

(10) Patent No.: US 9,838,852 B2
(45) Date of Patent: Dec. 5, 2017

(54) NETWORK NODES, METHODS PERFORMED THEREIN, COMPUTER PROGRAMS AND A COMPUTER READABLE STORAGE MEDIUM

(71) Applicant: Telefonaktiebolaget L M Ericsson (publ), Stockholm (SE)

(72) Inventors: Gunnar Mildh, Sollentuna (SE); Stefan Rommer, Västra Frölunda (SE); Ann-Christine Sander, Göteborg (SE); Göran Hall, Mölndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 465 days.

(21) Appl. No.: 14/416,222

(22) PCT Filed: Nov. 21, 2014

(86) PCT No.: PCT/SE2014/051397
§ 371 (c)(1),
(2) Date: Jan. 21, 2015

(87) PCT Pub. No.: WO2016/080882
PCT Pub. Date: May 26, 2016

(65) Prior Publication Data
US 2016/0150383 A1    May 26, 2016

(51) Int. Cl.
*H04W 4/12* (2009.01)
*H04W 76/02* (2009.01)
(Continued)

(52) U.S. Cl.
CPC ............ *H04W 4/12* (2013.01); *H04W 8/02* (2013.01); *H04W 76/021* (2013.01); *H04W 8/08* (2013.01);
(Continued)

(58) Field of Classification Search
CPC .......... H04W 4/12; H04W 8/02; H04W 8/08; H04W 8/12; H04W 36/12; H04W 36/0033; H04W 76/021
(Continued)

(56) References Cited

U.S. PATENT DOCUMENTS

2007/0091846 A1*  4/2007  Kim ................ H04W 36/0033
                                                          370/331
2011/0019644 A1    1/2011  Cheon et al.
(Continued)

OTHER PUBLICATIONS

International Search Report and Written Opinion for International Patent Application No. PCT/SE2014/051397, dated Aug. 7, 2015, 10 pages.

*Primary Examiner* — Lester Kincaid
*Assistant Examiner* — William Wang
(74) *Attorney, Agent, or Firm* — Withrow & Terranova, PLLC

(57) ABSTRACT

Embodiments herein relate to a method performed in a first network node for handling one or more signaling procedures of a wireless device in a wireless communication network. The first network node, receiving a first message from a second network node indicating an initiation of a signaling procedure for the wireless device; selecting a processing module for handling the signaling procedure; retrieving context of the wireless device; storing the retrieved context on the selected processing module; assigning a TRID to the signaling procedure, pointing to the selected processing module, which TRID being valid for an interval; and transmitting a second message to the second network node and/or another network node, which second message is associated with the signaling procedure and comprises the assigned TRID.

24 Claims, 11 Drawing Sheets

(51) Int. Cl.
*H04W 8/02* (2009.01)
*H04W 36/12* (2009.01)
*H04W 8/08* (2009.01)
*H04W 8/12* (2009.01)
*H04W 36/00* (2009.01)

(52) U.S. Cl.
CPC .......... *H04W 8/12* (2013.01); *H04W 36/0033* (2013.01); *H04W 36/12* (2013.01)

(58) Field of Classification Search
USPC ................................................. 455/436–444
See application file for complete search history.

(56) References Cited

U.S. PATENT DOCUMENTS

2013/0100929 A1* 4/2013 Liu ...................... H04W 36/00
370/331
2014/0192782 A1 7/2014 Centonza

* cited by examiner

NETWORK NODES, METHODS PERFORMED THEREIN, COMPUTER PROGRAMS AND A COMPUTER READABLE STORAGE MEDIUM

This application is a 35 U.S.C. §371 national phase filing of International Application No. PCT/SE2014/051397, filed Nov. 21, 2014, the disclosure of which is incorporated herein by reference in its entirety.

TECHNICAL FIELD

Embodiments herein relate to a first and second network node, methods performed therein, computer programs and a computer readable storage medium relating to wireless communication. In particular embodiments herein relate to handling signalling procedures of a wireless device in a wireless communication network.

BACKGROUND

In a typical wireless communication network, wireless devices, also known as mobile stations and/or user equipments (UEs), communicate via a Radio Access Network (RAN) to one or more core networks (CN). The RAN covers a geographical area which is divided into cell areas, with each cell area being served by a base station, e.g., a radio base station (RBS), which in some networks may also be called, for example, a "NodeB" or "eNodeB" (eNB). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. The base stations communicate over the air interface operating on radio frequencies with the wireless devices within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, called eNodeBs in LTE, and the core network. As such, the Radio Access Network (RAN) of an EPS has an essentially "flat" architecture comprising radio base stations without reporting to RNCs.

Furthermore, EPC is made up of several nodes including a Mobility Management Entity (MME) which communicates with the eNodeBs in E-UTRAN over the S1-MME interface and with a Serving GateWay (S-GW) in the EPC over the S11 interface. The S-GW communicates with the Packet Data Network-GateWay (PDN-GW) over the S5 interface. The control plane part of S5 and S11 is using General Packet Radio Service Tunneling Protocol-Control Plane (GTP-C) version 2 protocol, while the S1-MME uses the S1-Application Protocol (AP). The communication over these interfaces is either node related or wireless device related. In case it is wireless device related specified identifiers are used to associate the signalling messages with the wireless device connection. Over S1-AP an MME UE S1AP Identity (ID) and an eNB UE S1AP ID are used. Over S5 and S11 a Control Tunnel Endpoint Identifier (TEID) is used. These IDs are allocated and used as long as the 51 and S5/S11 wireless device connection exists and can only be changed for new connections. In addition to these identifiers also identifiers known in the wireless device are used such as the International Mobile Subscriber Identity (IMSI), International Mobile Station Equipment Identity (IMEI) and Packet-Temporary Mobile Subscriber Identity (P-TMSI) or SAE-Temporary Mobile Subscriber Identity (S-TMSI).

In a typical product implementation in a network node such as the MME, as well as the eNB, S-GW, PDN-GW, context identifiers are used to route messages or control messages to a right processing module, such as a processing board or virtual machine emulating a processing board or part of a processing board, which has the context of the wireless device and terminates all wireless device related signalling. This works since the context identifiers of the wireless device are different in different directions so that each side can dictate how they want the context of the wireless device to be addressed. Context of a wireless device comprises e.g. different identities such as wireless device identity and cell identity serving the wireless device, radio bearer information associated to the wireless device, mobility management state, location information of the wireless device and similar.

Since the current identifiers used over S1, S11, and S5, such as the MME UE S1AP ID, and the TEIDs used in GTP-C are allocated for the whole connection, S1 UE signalling connection over S1, and as long as there are any UE bearers over S5, S11, it is not possible to quickly change the processing module that handles a specific wireless device related message, assuming these identities are also used for internal routing in the receiving node. This means that the same processing module needs to handle the same context of the wireless device for a long period, which could make it difficult to load share been processing modules, i.e. change load between processing modules, or load share when adding or removing a processing module. This results in an inefficient handling of signalling procedures with the static use of the same processing module for signalling procedures for a certain wireless device.

SUMMARY

An object of embodiments herein is to provide a mechanism that handles signalling procedures in an efficient manner.

According to an aspect the object is achieved by a method performed in a first network node for handling one or more signalling procedures of a wireless device in a wireless communication network. The first network node comprises one or more processing modules for handling signalling procedures. The first network node receives a first message from a second network node indicating an initiation of a signalling procedure for the wireless device, which signalling procedure comprises one or more transactions between the first network node and the second network node and/or another network node. The first network node selects a processing module out of the one or more processing modules for handling the signalling procedure. The first network node retrieves context of the wireless device from a session data base to the processing module. The first network node stores the retrieved context of the wireless device on the selected processing module. The first network node assigns a temporary routing identity, TRID, to the signalling procedure, pointing to the selected processing module comprising the retrieved context of the wireless device, which TRID is valid for an interval, which interval is defined by number of transactions, type of transaction and/or a time threshold. The first network node transmits a second message to the second network node and/or another network node, which second message is associated with the signalling procedure and comprises the assigned TRID.

According to an aspect the object is achieved by a method performed in a second network node for handling a signalling procedure of a wireless device in a wireless communication network. The signalling procedure is initiated by a first message transmitted to a first network node and the signalling procedure comprises one or more transactions between the first network node and the second network node and/or another network node. The second network node receives a second message from the first network node, which second message is associated with the signalling procedure and comprises a TRID. The TRID is used for an interval, which interval is defined by number of transactions, type of transaction and/or a time threshold. The second network node transmits to the first network node within the interval, a third message as a response to the second message, and which third message comprises the TRID.

According to another aspect the object is achieved by providing a first network node for handling one or more signalling procedures of a wireless device in a wireless communication network. The first network node comprises one or more processing modules for handling signalling procedures. The first network node is configured to receive a first message from a second network node indicating an initiation of a signalling procedure for the wireless device. The signalling procedure comprises one or more transactions between the first network node and the second network node and/or another network node. The first network node is configured to select a processing module out of the one or more processing modules for handling the signalling procedure. The first network node is further configured to retrieve context of the wireless device from a session data base to the processing module. The first network node is configured to store the retrieved context of the wireless device on the selected processing module. The first network node is also configured to assign a TRID to the signalling procedure, pointing to the selected processing module comprising the retrieved context of the wireless device, which TRID is valid for an interval. The interval is defined by number of transactions, type of transaction and/or a time threshold. The first network node is additionally configured to transmit a second message to the second network node and/or another network node, which second message is associated with the signalling procedure and comprises the assigned TRID.

According to yet another aspect the object is achieved by providing a second network node for handling a signalling procedure of a wireless device in a wireless communication network. The signalling procedure is initiated by a first message transmitted to a first network node and the signalling procedure comprises one or more transactions between the first network node and the second network node and/or another network node. The second network node is configured to receive a second message from the first network node, which second message is associated with the signalling procedure and comprises a TRID. The TRID is used for an interval, which interval is defined by number of transactions, type of transaction and/or a time threshold. The second network node is further configured to transmit to the first network node within the interval, a third message as a response to the second message, and which third message comprises the TRID.

Embodiments herein further disclose computer programs comprising instructions, which, when executed on at least one processor, cause the at least one processor to carry out the methods herein, as performed by the first network node or the second network node. It is further provided a computer-readable storage medium comprising any of the computer programs.

An advantage with embodiments herein is that embodiments allow a more state-less implementation of the first network node, meaning that the context of a wireless device can be handled by any processing module at any time in the first network node using the TRID limited to an interval. Embodiments further make it possible to route messages via the TRID, e.g. response messages, back to a specific processing module within the interval. Further advantages of a more state-less implementation are that it becomes easier to scale up and down the number of processing modules, e.g. handled as virtual machines, and that it is easier to load share between processing modules, since the allocation to a processing module may be different for every signalling procedure as the TRID is valid for or limited to the interval and may then be released. Also simplified redundancy mechanisms is an advantage of a state-less implementation when any other processing module can handle the processing for a certain wireless device as the load balancing does not direct to one and the same processing module for the life time of the connection identity, e.g. S1-AP ID or GTP TEID, as the use of the TRID is limited to the interval. This results in that signalling procedures are handled in an efficient manner.

BRIEF DESCRIPTION OF THE DRAWINGS

Embodiments will now be described in more detail in relation to the enclosed drawings, in which.

DETAILED DESCRIPTION

Figure 1:
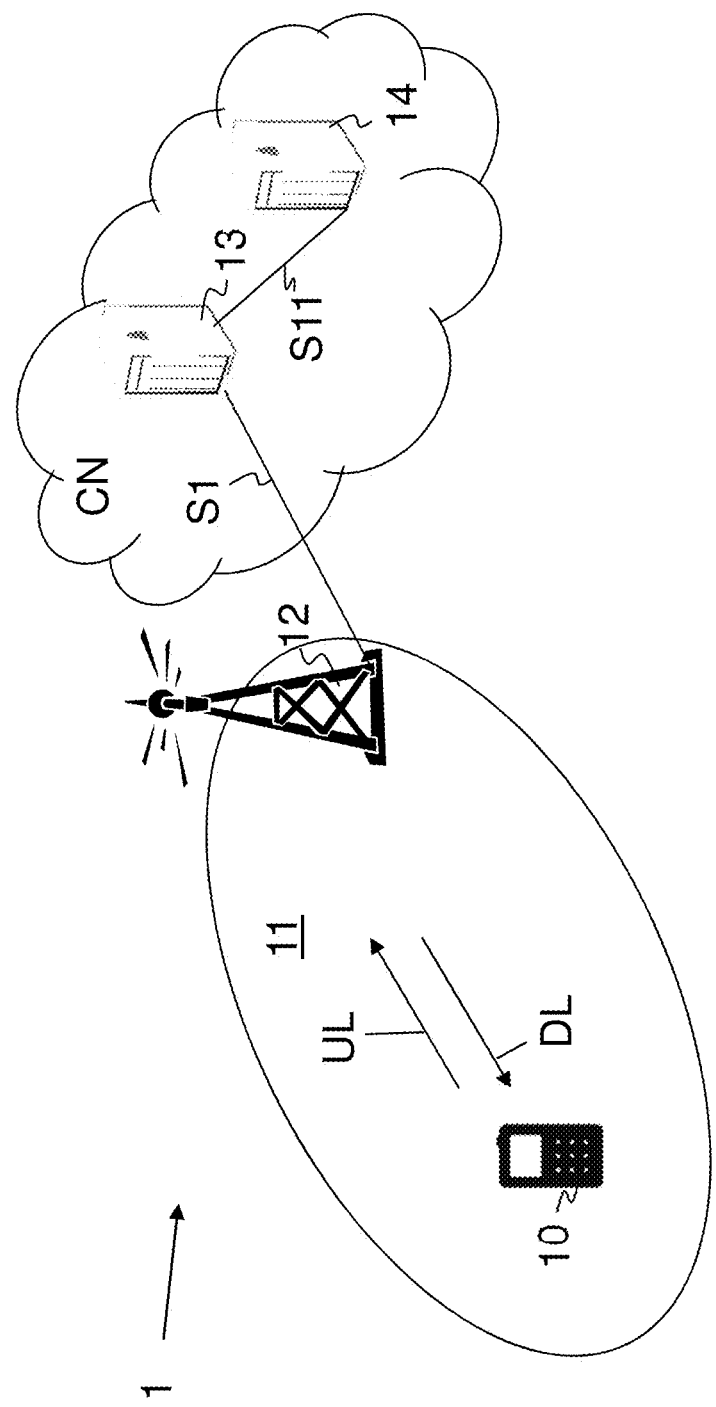
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or a node, e.g. a smart phone, a laptop, a mobile phone, a sensor, a relay, a mobile tablet or even a small base station communicating within respective cell.

The wireless communication network 1 covers a geographical area which is divided into cell areas, e.g. a cell 11 being served by a network node such as a radio base station 12. The radio base station 12 may also be referred to as a first radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The radio base station 12 may serve one or more cells, such as the cell 11. A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but use different frequency bands. Each cell is identified by an identity within the local radio area, which is broadcast in the cell. Another identity identifying the cell 11 uniquely in the whole wireless communication network 1 is also broadcasted in the cell 11. The radio base station 12 communicates over the air or radio interface operating on radio frequencies with the wireless device 10 within range of the radio base station 12. The wireless device 10 transmits data over the radio interface to the radio base station 12 in Uplink (UL) transmissions and the radio base station 12 transmits data over a radio interface, also referred to as air interface, to the user equipment 10 in Downlink (DL) transmissions.

Furthermore, the wireless communication network 1 comprises another network node such as an MME 13. The MME 13 is configured to e.g. be involved in handling mobility regarding the wireless device 10 by e.g. being responsible for initiating paging and authentication of the wireless device 10. The MME 13 furthermore keeps location information for each wireless device and is involved in choosing a correct gateway during the initial registration process. The MME 13 is also involved in handover signalling between LTE and 2G/3G networks. The wireless communication network 1 may further comprise a network node such as an S-GW 14. The S-GW 14 is configured to route/forward packets to and from the MME 13 and the radio base station 12. MME 13 connects to the radio base station 12 through an S1 interface and connects to the S-GW 14 through a S11 interface.

The MME 13 is denoted herein, in the figures and description, as a first network node and the radio base station 12 and the S-GW 14 are herein denoted as second network nodes or other network nodes. It should however be noted that embodiments herein is not limited to this case, and embodiments herein may be applied to other nodes in the wireless communication network 1, e.g. the first network node may for example be the radio base station 12, an RNC, the S-GW 14, a PDN-GW, or a Policy and Charging Rules Function (PCRF) node, and the second network node may for example be the MME 13, an RNC, another S-GW, a PDN-GW, or a PCRF node.

Figure 2:
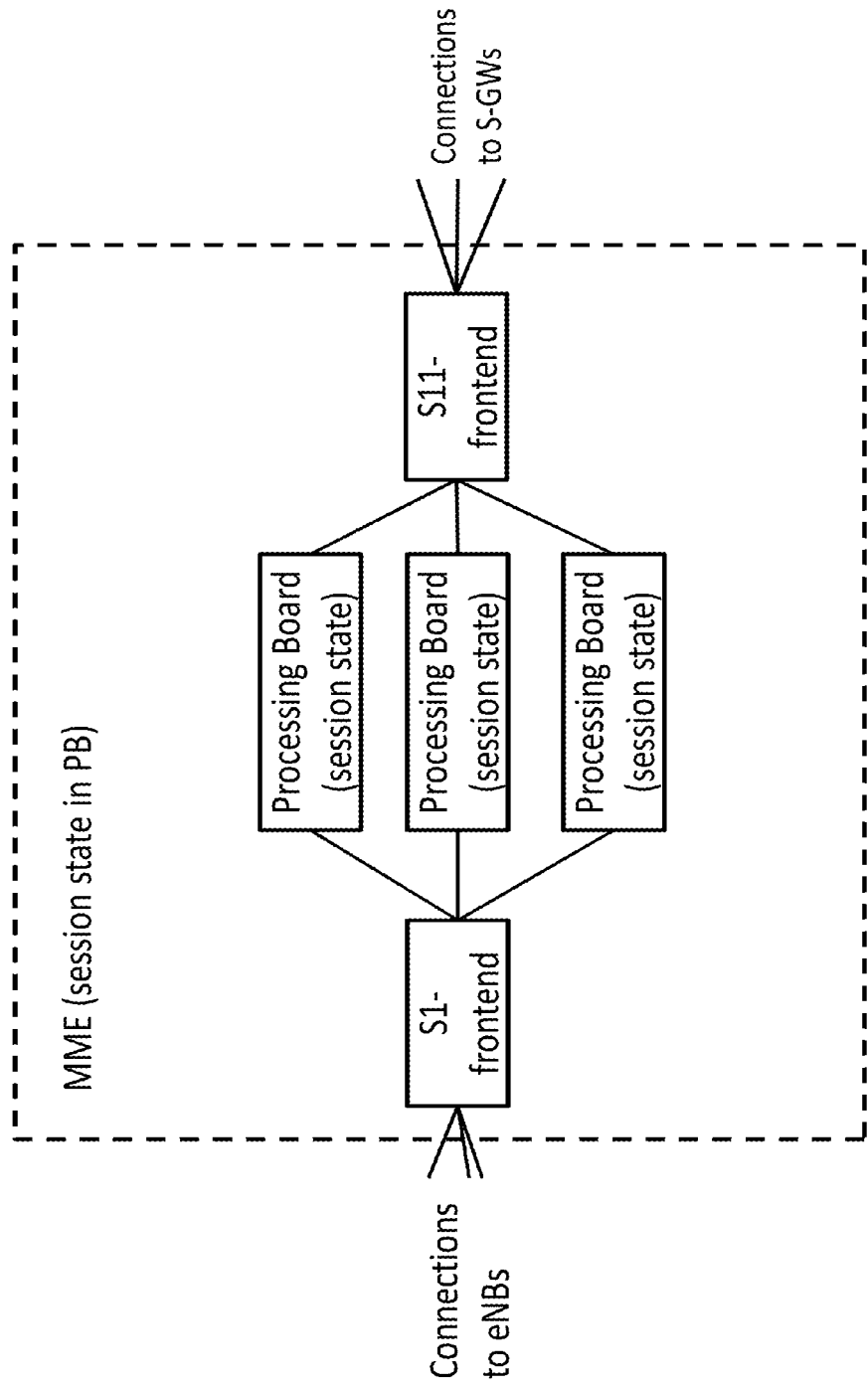
FIG. 2 shows a block diagram depicting a MME architecture according to prior art.

FIG. 2 shows an example of a simplified first network node architecture exemplified as an MME architecture. In this MME architecture there are S1 and S11 front-end functions, which route incoming messages from S1-AP and GTP-C to a specific Processing Board (PB), being an example of a processing module. This routing is according to prior art assumed to be based on identities denoted as the MME UE S1AP ID and the GTP TEID as well as the MME IP address/es. The routing may also be based on e.g. IMSI, P-TMSI, S-TMSI, or Globally Unique Temporary ID (GUTI), which are IDs used for example prior to the establishment of MME UE S1AP ID.

The Processing Boards in the architecture according to FIG. 2 contain context information related to the wireless device session state of the different wireless devices connected to the MME. Each PB handles a set of different wireless devices associated with a different set of MME UE S1AP IDs and GTP TEIDs. In this solution, where one processing module handles the same wireless device throughout the connection, it is a larger burden to scale up and down the number of processing modules, and do load sharing since the process to migrate a context of the wireless device from one processing module takes time prolonging the process of load sharing, and is seen by communicating entities, new connections need to be setup to the second network nodes, eNB and/or S-GW.

Figure 3:
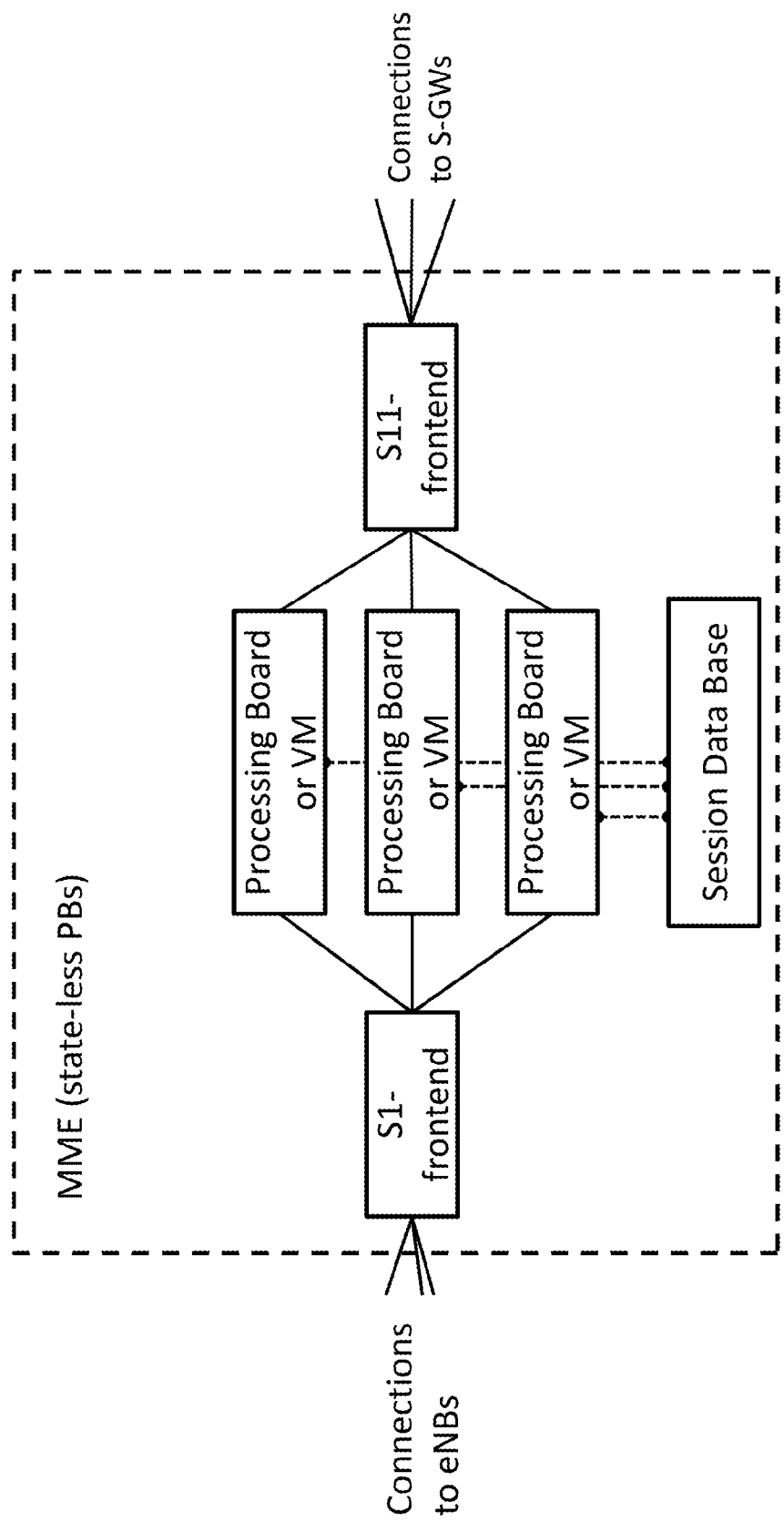
FIG. 3 shows a block diagram depicting a MME architecture.

FIG. 3 shows an example of a simplified network node architecture with state-less Processing Boards (PB) or Virtual Machines (VM) being examples of processing modules. According to this network node architecture wireless device session state, also called context of wireless device, is stored in a separate Session Data Base (SDB) function instead of in a processing module. Whenever a processing module should execute a signalling procedure associated with a wireless device the processing module will retrieve the context of the wireless device from the SDB, perform the procedure and then update the SDB with the new context of the wireless device. The ID used to retrieve the context from the SDB could be the MME UE S1AP ID and the GTP TEID. The routing can also be based on IMSI, P-TMSI, S-TMSI, GUTI etc. which is used for example prior to the establishment of MME UE S1AP ID.

In the network node architecture according to FIG. 3, any processing module can handle any wireless device since any processing module may retrieve the context of the wireless device. Thus, the potential advantage of this network node architecture is that it allows for very fast scaling up and scaling down of processing module capacity, since the S1 and S11 frontends can distribute load on a per message basis to the processing modules. This sort of network node architecture could be particularly useful if the processing module function is performed on VMs in a data center, and where the number of VMs, and the overall processing capacity, can be changed in a dynamic way. One issue with this architecture is the extra delay it takes to retrieve and update the context since it is stored outside the processing module. This could be a particular problem for procedures involving many signalling steps, which in this architecture could involve SDBs signalling for every signalling step. Embodiments herein solve this problem by making it possible to keep an ongoing signalling procedure in the same processing module when desired, and only change processing modules between signalling procedures, i.e. after an interval, as will be further explained below. In this way this solution allows a good compromise between a solution comprising processing modules with all data local in the processing module, which is a fast solution, and a state-less solution with all data in SDB, which is a scalable solution. A signalling procedure is defined as a procedure that comprises one or more transactions between a first network node, such as the MME 13, and a second network node, such as the radio base station 12 and/or another network node, such as the S-GW 14. A transaction comprise a message exchange or a response process, i.e. a request that is responded either to the same network node or to another network node.

Figure 4:
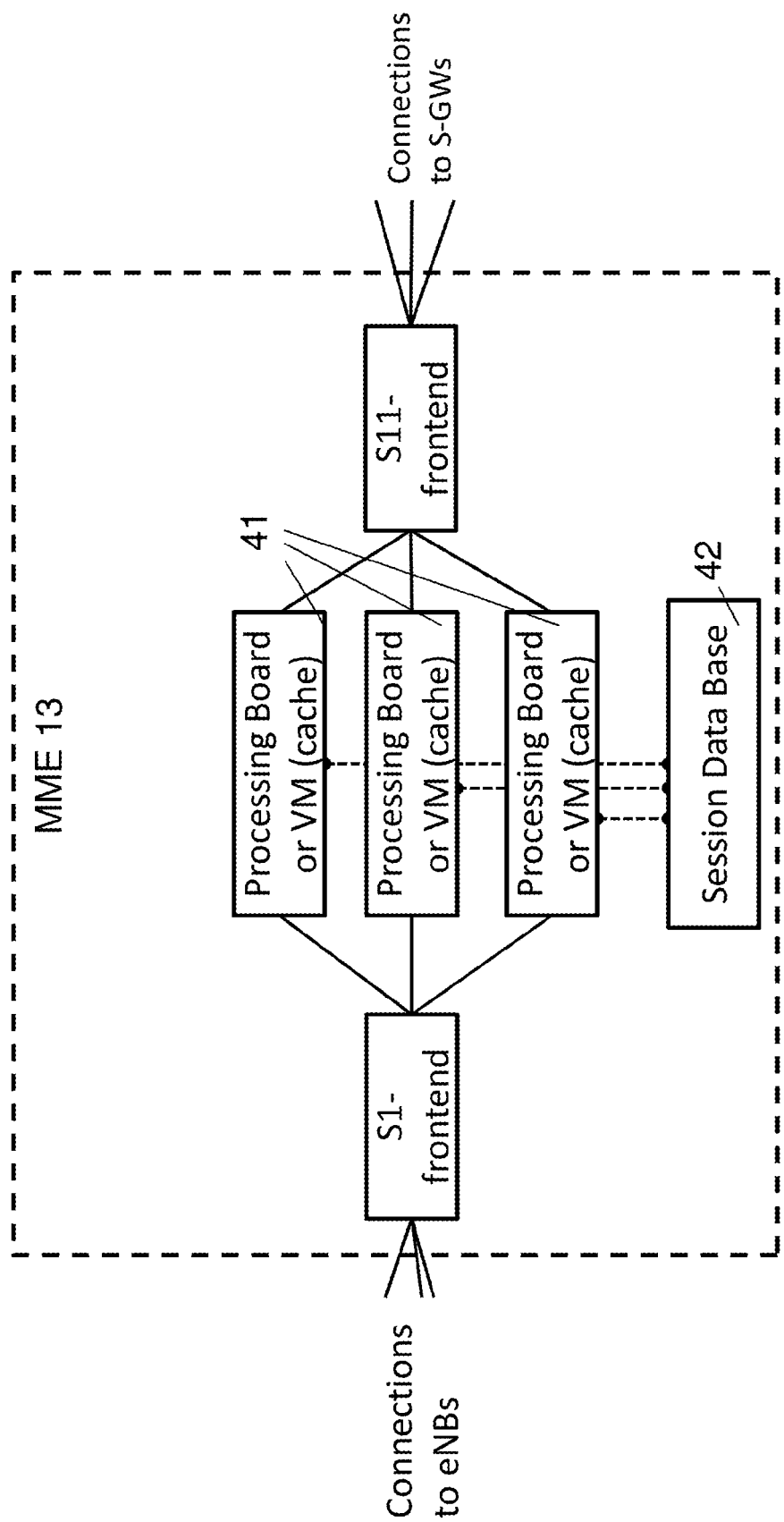
FIG. 4 shows a block diagram depicting a MME architecture according to embodiments herein.

According to embodiments herein a network node architecture that supports a flexible transaction handling, or signalling procedure handling, using Temporary Routing IDs (TRID) is provided. FIG. 4 shows an example of a network node architecture with processing modules 41 according to embodiments herein. This network node architecture has some similarities with the network node architecture with state-less processing modules discussed in FIG. 3 above. A difference is though that the processing modules according to the present disclosure are capable of storing ongoing wireless device related signalling procedure in a local wireless device state in the processing module, e.g. a signalling procedure cache, denoted 'cache' in the FIG. 4.

In order for core network messages or EPC messages, such as S1 and S11 messages, to be routed to the processing modules 41 with an active procedure cache, one or more TRIDs are assigned to the S1 and S11 messages, which TRIDs point to the processing module 41 serving the wireless device 10, with the context of the wireless device 10 in that processing module 41. These TRIDs are communicated to the radio base station 12 and/or S-GW 14 as part of the signalling procedures, and are echoed back in the response messages from the radio base station 12 and/or the S-GW 14. The TRID is used by S1 and S11 front ends to route the message to the right serving/selected processing module 41, similar to how routing identities MME UE S1AP ID and GTP TEID are used in the stateful case described in FIG. 2. The TRID may also be used internally in the processing module 41 to point to the context of the wireless device 10.

The TRID is assigned and points to the selected processing module 41 comprising, or being associated with, the context for a limited interval, limited for the signalling procedure being a part of the connection of the wireless device, or limited for the signalling procedure covering an interval, i.e. the TRID being valid for the interval. The interval is defined by number of transactions, type of transaction and/or a time threshold limiting the signalling procedure is time. When there is no longer any need to continue the signalling procedure in a specific processing module the context in the processing module and the TRID may be released. This may e.g. be done automatically in all network nodes when the interval has ended e.g. when a last message of a signalling procedure has been processed or when a certain time has passed after having received a message for a specific wireless device. Alternatively or additionally, the release may be explicitly indicated from the MME 13 to the radio base station 12 and the S-GW 14, e.g. by a special value of the TRID or by including an empty TRID Information Element (IE).

Hence, embodiments herein introduce a new routing ID called Temporary Routing ID (TRID), over e.g. the S1, S11 and S5 interfaces, which can be changed at any time for an ongoing connection defined by an interval e.g. for every transaction, after a number of transactions, for a certain type of transaction and/or after a time interval. This TRID is echoed back in any response message over the interfaces making it possible to route the response message back to that processing module which initiated the transaction of the signalling procedure.

Thus, the TRID to an ongoing signalling procedure in a wireless communication network makes it possible to route related messages to the same "stateless" processing module 41, improving the performance, while still maintaining the scalability benefits for "stateless" nodes with a Session Data Base 42, being a separated unit or comprised in the MME 13. Embodiments herein also include that there are defined signalling sequences, transactions, on the S1, S11 and S5 interfaces where the TRID is constant during such signalling sequence, and after such defined signalling sequence any state information or context of the wireless device 10 in the MME 13 is stored or indicated to the SDB 42.

Figure 5:
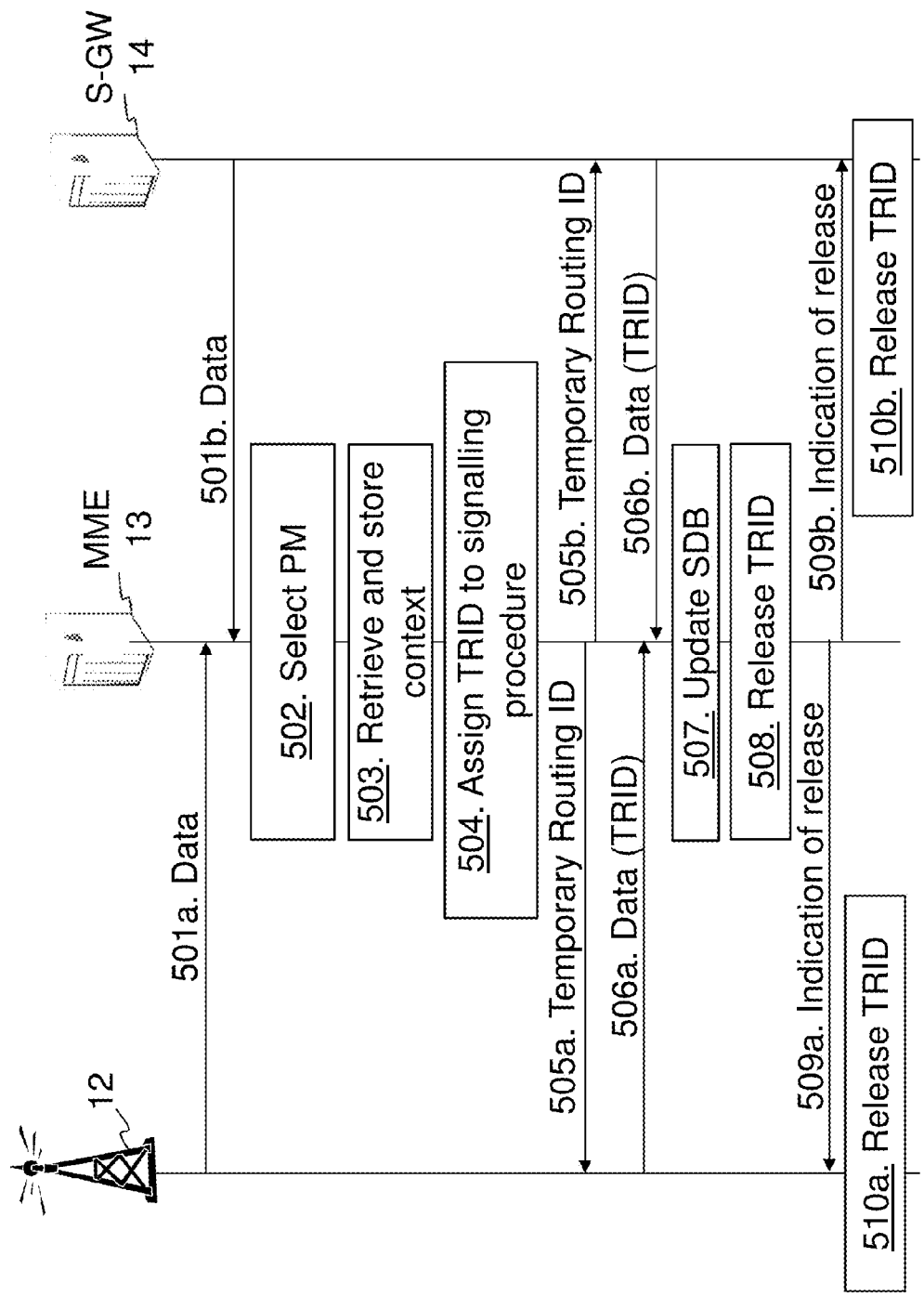
FIG. 5 shows a schematic combined flowchart and signalling scheme according to embodiments herein.

FIG. 5 shows a combined flowchart and signalling scheme depicting a scenario according to some embodiments herein.

Action 501a. The radio base station 12 initiates a signalling procedure for the wireless device 10 by e.g. transmitting data to the MME 13.

Action 501b. The S-GW 14 may alternatively or additionally initiate a signalling procedure by e.g. transmitting data to the MME 13.

Action 502. The MME 13 then selects a processing module (PM) out of one or more processing modules for handling the signalling procedure.

Action 503. The MME 13 retrieves context of the wireless device 10 for a session of a connection for the wireless device 10. This retrieved context is stored on the selected processing module.

Action 504. The MME 13 then assigns a TRID, to the signalling procedure, pointing to the selected processing module with the retrieved context. The TRID may point at a processing board or virtual machine and may also point to the context stored thereon. The context may also be found with some other interface specific identifier carried in a signalling message such as S-TMSI, GTP TEID, GUTI etc. The assignment of the TRID or the TRID is limited or valid for an interval, which interval is defined by number of transactions, type of transaction and/or a time threshold. Thus, the TRID is only valid for a part of the connection making it more flexible to load balance and/or add extra or remove processing modules to the MME 13. Parameters such as GUTI etc., which are valid for the whole connection, or as long time the wireless device 10 is connected to the network node, cannot be used as a TRID, but rather they are stored in the SDB 42. The GUTI may be stored in the SDB 42, making it possible to not change the GUTI when the context is released from the processing module and a new processing module handles the context, e.g. when TRID changes. In a typical implementation of the legacy solution the GUTI is tied to a processing module, and embodiments herein separate the GUTI and the processing module from each other enabling load balancing etc. without changing the GUTI which would require wireless device signalling.

Since previous routing identities such as the GUTI and other long lived session parameters are stored in the SDB 42, it is also not required to change these parameters when changing signalling process and/or TRID, making load balancing possible without the need to change these routing identities which would include, for instance, wireless device signalling.

Action 505a. The MME 13 may then transmit a second message to the radio base station 12, which second message is associated with the signalling procedure and comprises the assigned TRID. This may be a request message of the signalling procedure.

Action 505b. Additionally or alternatively, the MME 13 may then transmit a second message to the S-GW 14, which second message is associated with the signalling procedure and comprises the assigned TRID. This may be a request message of the signalling procedure.

Action 506a. The radio base station 12 may then transmit to the MME 13 within the interval, a third message as a response to the second message, and which third message comprises the TRID. This may be a response message of the signalling procedure.

Action 506b. Additionally or alternatively, the S-GW 14 may then transmit to the MME 13 within the interval, a third message as a response to the second message, and which third message comprises the TRID. This may be a response message of the signalling procedure.

Action 507. The MME 13 may update the SDB 42 with the context to be associated with the selected processing module. The MME 13 may further update additionally or alternatively content of the context of the wireless device 10 in the session data base 42. The MME 13 may update the content of a session context of the wireless device 10 in the SDB 42. This may be done at the time of releasing the TRID, but it can also be done more often, to make sure that the session context or context of the wireless device 10 is up to date.

Action 508. The MME 13 releases the TRID from the selected processing module and/or the retrieved context stored on the processing module when the interval, or signalling procedure, ends while the wireless device 10 is still being connected.

Action 509a. The MME 13 may transmit an indication of the release to the radio base station 12.

Action 509b. The MME 13 may transmit an indication of the release to the S-GW 14.

Action 510a. The radio base station 12 then releases the TRID and removes the TRID from upcoming messages.

Action 510b. The S-GW 14 then releases the TRID and removes the TRID from upcoming messages.

Two example signalling procedures are shown below; a first signalling procedure, exemplified as an PDN Connection establishment in FIG. 6, handled by a first processing board in the MME 13, denoted as MME PB1 or VM1 and being an example of the processing module 41 above, and a second signalling procedure, exemplified as a dedicated bearer establishment in FIG. 7, for the same wireless device 10 handled by a second processing board in the MME 13, denoted as MME PB2 or VM2 and being an example of the processing module 41 above. The principles for selection of TRID for an interface or signalling procedure and including the TRID in messages to/from the network node would apply to other signalling procedures.

Figure 6:
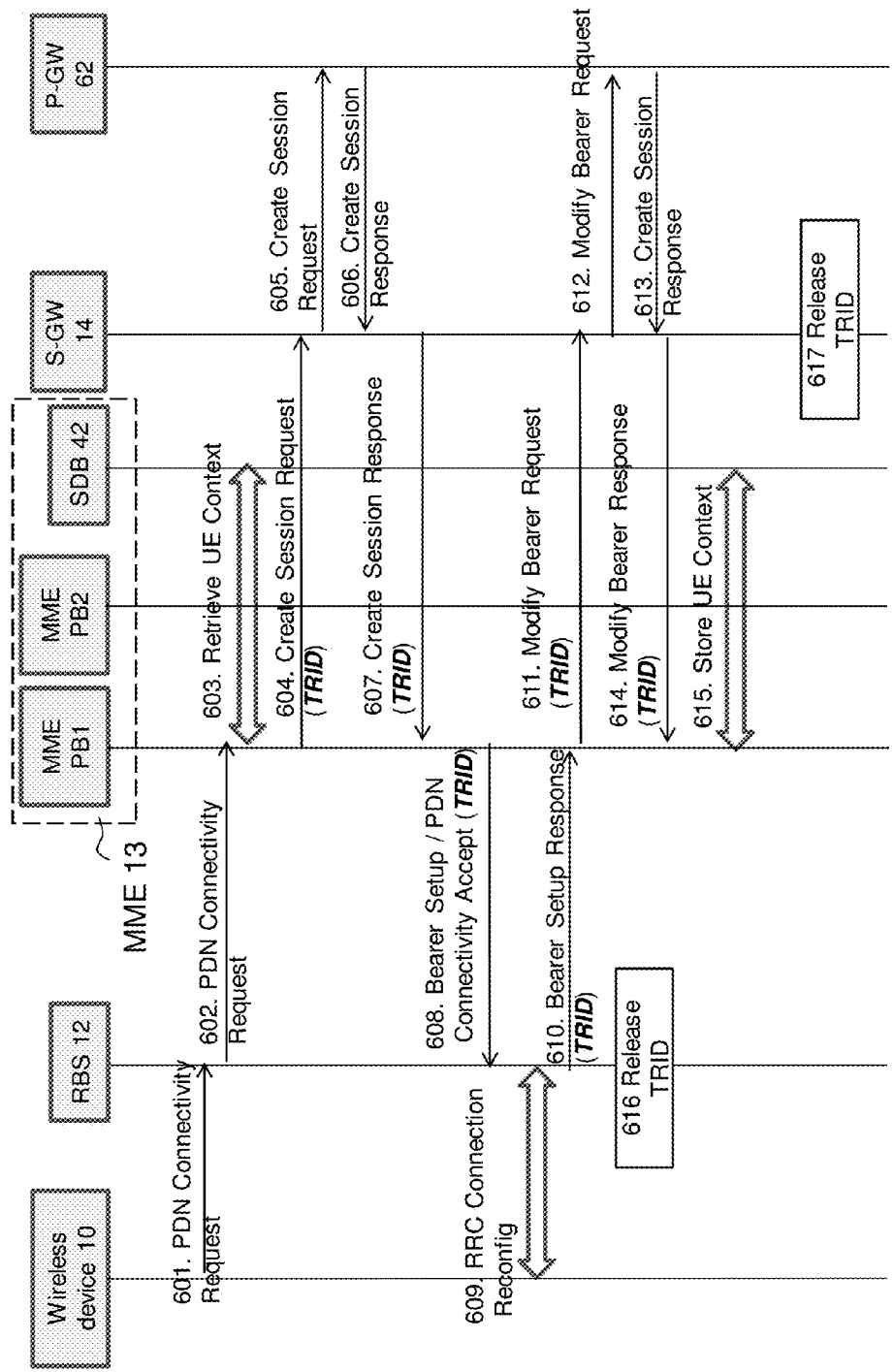
FIG. 6 shows a schematic combined flowchart and signalling scheme according to some embodiments herein.

FIG. 6 shows a signalling procedure depicting a more detailed example of usage of Temporary Routing ID (TRID) by the MME 13, wherein the procedure is exemplified as a PDN Connection establishment being initiated from the radio base station 12.

Action 601. The wireless device 10 transmits a PDN connectivity request to the network e.g. the radio base station 12.

Action 602. The radio base station 12 forwards the PDN connectivity request to the MME 13. This corresponds to action 501a in FIG. 5. The first message of the signalling procedure, being the RDN connectivity request, that reaches the MME 13 is directed by a S1 frontend of the MME 13 to a MME PB/VM, in this case MME PB1. The selection of PB/VM may e.g. be based on load balancing and the destination IP address and/or MME UE S1AP ID, see action 502 above in FIG. 5.

Action 603. The MME 13 or the MME PB1 retrieves the context of the wireless device 10 from the SDB 42. This is an example of Action 503 above in FIG. 5.

Action 604. The MME 13 or the MME PB1 assigns or selects a TRID, that may be a first TRID such as a S11 TRID, for this procedure and includes it in a message, e.g. the MME 13 may include the first TRID in a "create session request" and sends it to the S-GW 14 see e.g. actions 504 and 505b in FIG. 5.

Action 605. The S-GW 14 sends a 'create session request' to a PDN gateway (P-GW) 62.

Action 606. The P-GW 62 transmits a 'create session response' to the S-GW 14, e.g. indicating that a session is set up.

Action 607. The S-GW 14 includes the TRID, received from the MME 13 in action 604, in a reply message, such as the 'create session response' and sends it to the MME 13, being an example of action 506b in FIG. 5. A S11 front end of the MME 13 directs the reply message to the corresponding MME PB1 based on the TRID.

Action 608. The MME 13 or the MME PB1 includes a second TRID e.g. S1 TRID, for S1 in a S1 message sent to radio base station 12. This corresponds to actions 504 and 505a in FIG. 5. The first TRID may be the same or different than the second TRID. The S1 message may be a Bearer Setup/PDN Connectivity Accept.

Action 609. The radio base station 12 sets up a Radio Resource Control (RRC) connection reconfiguration with the wireless device 10.

Action 610. The radio base station 12 then transmits a Bearer Setup Response comprising the second TRID in the Bearer Setup Response sent to MME 13. The S1 front end directs the Bearer Setup Response to the corresponding MME PB1 associated with the second TRID. This corresponds to action 506a in FIG. 5

Action 611. The MME 13 or the MME PB1 may then add or include a third TRID, such as a S11 TRID different from the first TRID, or the first TRID, in a message, such as a Modify Bearer Request, and sends it to the S-GW 14. This corresponds to actions 504 and 505 in FIG. 5. Alternatively no TRID is included in this Modify Bearer Request and S-GW 14 just continues to use the same TRID as previously received in action 604.

Action 612. The S-GW 14 transmits the Modify Bearer Request to the P-GW 62.

Action 613. The P-GW 62 transmits a Modify Bearer Response to the S-GW 14.

Action 614. The S-GW 14 includes or adds the third or first TRID, such as S11 TRID received in action 611 or 604 in the Modify Bearer Response and sends it to MME 13. E.g. if no TRID is received in action 611 the S-GW 14 includes the TRID previously received in action 604. The S11 front end directs the message e.g. the Modify Bearer Response, to the corresponding MME PB1 taking the TRID into account. This corresponds to action 506b in FIG. 5

Action 615. The MME 13 or the MME PB1 the stores the context of the wireless device 10 in the SDB 42. This corresponds to action 507 in FIG. 5

Action 616. The radio base station 12 releases the TRID, e.g. the second TRID. This corresponds to action 510a in FIG. 5

Action 617. The S-GW 14 releases the TRIDs, e.g. the first and third TRID. This corresponds to action 510b in FIG. 5.

It should be understood that the messages to the MME 13 goes via a front end module (shown in FIG. 4) that depending on if TRID is included in the message or not performs/or directs the message to a certain processing module.

Figure 7:
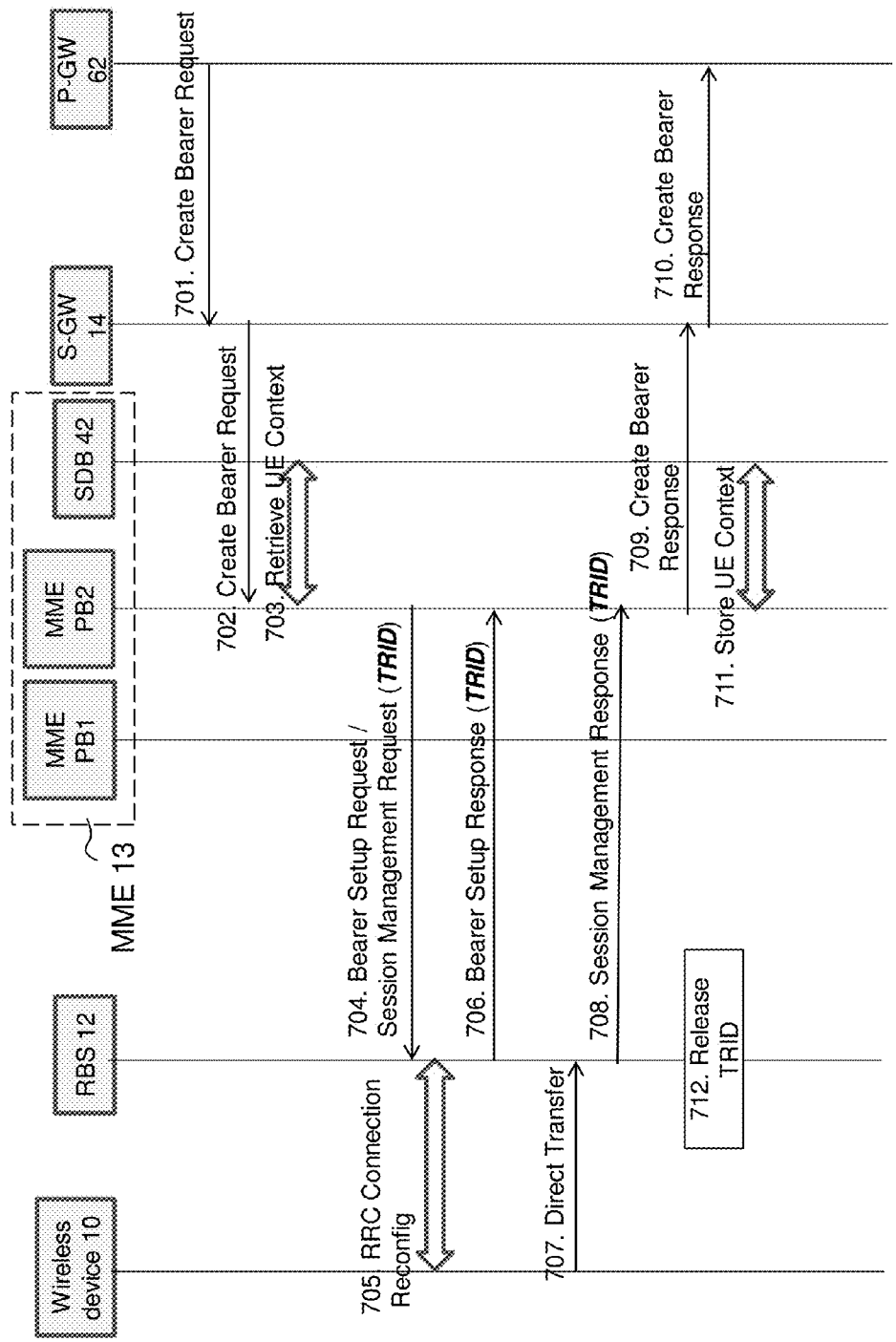
FIG. 7 shows a schematic combined flowchart and signalling scheme according to some embodiments herein.

FIG. 7 shows a signalling procedure depicting a more detailed example of usage of Temporary Routing ID (TRID) by the MME 13, wherein the procedure is exemplified as a dedicated bearer establishment. If a new signalling procedure is started, new compared to the signalling procedure in FIG. 6, this may be handled by another MME PB, the second MME PB denoted as MME PB2. FIG. 7 shows a Dedicated Bearer Establishment being initiated from a packet core network node such as the P-GW 62.

Action 701. The P-GW 62 sends a 'create bearer request' to the S-GW 14.

Action 702. The S-GW 14 sends the 'create bearer request' to the MME 13. This corresponds to action 501b in FIG. 5. A first message of the signalling procedure, being the 'create bearer request', that reaches the MME 13 is directed by a S11 front end of the MME 13 to a MME PB/VM, in this case MME PB2. The selection of PB/VM may e.g. be based on load balancing and the destination IP address and/or GTP-C TEID, see action 502 above.

Action 703. The MME PB2 or the MME 13 retrieves a context of the wireless device 10 from the SDB 42 for this procedure or session. This corresponds to action 503 in FIG. 5.

Action 704. The MME 13 or the MME PB2 selects or associates a first TRID, e.g. a S1 TRID, for this procedure and includes it in a message, e.g. 'bearer setup request' and/or 'session management request', sent to the radio base station 12, being an example of actions 504 and 505a in FIG. 5.

Action 705. The radio base station 12 sets up an RRC configuration such as a RRC connection reconfiguration with the wireless device 10.

Action 706. The radio base station 12 then transmits a response such as a 'bearer setup response' with the first TRID to the MME 13. E.g. the radio base station 12 includes the S1 TRID in a reply message sent to MME 13. The S1 front end directs the message to the corresponding MME PB/VM. This corresponds to action 506a in FIG. 5.

Action 707. The wireless device 10 may send data to a destination node using the setup bearer, denoted direct transfer to the radio base station 12.

Action 708. The radio base station 12 sends a message, such as a session management response, to the MME 13. Also in this message, part of the same signalling procedure, the radio base station 12 includes the TRID, received in action 704, in the reply message sent to MME 13. The S1 front end directs the message to the MME PB2 associated with the TRID.

Action 709. The MME 13 or the MME PB2 sends a 'create bearer response' to the S-GW 14.

Action 710. The S-GW 14 sends the create bearer response to the P-GW 62.

Action 711. The MME 13 or the MME PB2 stores the context of the wireless device 10 in the SDB 42. This corresponds to action 507 in FIG. 5.

Action 712. The radio base station 12 releases the TRID. This corresponds to action 510a in FIG. 5.

It should be understood that the messages to the MME 13 goes via a front end (not shown) that depending if TRID is included in the message or not performs/or directs the message to a certain processing module.

When processing of a signalling procedure, also referred to as transaction or number of transactions, as described in e.g. FIGS. 5-7 above, is ongoing on a processing module, concurrent signalling may occur, i.e. another procedure or transaction is started for the same wireless device 10 either on the same interface or originated from another node on another interface. This is sometimes referred to as signalling interference. Embodiments herein cater for handling such signalling interference. E.g. some embodiments set/update a flag or other indication, see action 507 above or 810 below, in the SDB 42 when a processing module has fetched the context of the wireless device 10 so if another processing module tries to fetch the context, there is an active indication that this context is already in use by some other signalling procedure in a processing module. An error handling in such situation may vary from procedure to procedure, but the general mechanism would be to send a negative response to the originating party of the interfering transaction.

The indication or flag in the SDB 42 is then re-set when the procedure is completed and the processing module feeds back the context to the SBD 42, see actions 615 and 711 in FIGS. 6 and 7.

Another alternative is that the TRID related to any ongoing signalling procedure in one processing module is stored in the SDB 42, so that it is possible to route any interfering signalling to the same processing module even if that signalling is first received in another processing module. This alternative would be based on that a second processing module receiving the other signalling or procedure, contacts the SBD 42, learns or retrieves indication that there is an ongoing procedure handled by a different processing module, e.g. a first processing module, and forwards the received signalling message to that first processing module. In this way the interfering signalling will be handled by the same processing module making it possible to queue transactions.

In addition to the TRID, it would also be possible to assign a sequence number which is associated with the TRID and conveyed in each message from the MME 13. The sequence number may be incremented for each message or procedure. In this way it may be possible to determine if there is any out of order messages, or if a message is associated with an old signalling procedure, e.g. in case of a TRID is re-used. The initial value of the sequence number may be assigned at the MME 13 and transmitted by the MME 13 to the other nodes, i.e. the radio base station 12 or the S-GW 14, in the same way as the TRID.

An alternative method for handling issues with TRIDs that are re-used is to avoid re-using a TRID for a certain time after the TRID was last used, in order to make sure no other signalling procedure is still using the TRID. In this case each processing module would be associated with multiple TRIDs.

One additional method that can be used to handle signalling interference is if nodes communicating with the MME 13 opportunistically re-use old TRIDs for new messages from the same wireless device 10 for a certain time period after the last signalling procedure. This would increase the probability that an interfering message get routed directly to the correct processing module still handling the wireless device 10. If the processing module has already released the context, the message would be allocated to the same processing module again. E.g. if a signalling procedure is triggered from the wireless device 10 after actions 609/610 in FIG. 6 the RBS 12 may re-use the TRID, making it possible to route this signalling procedure to the same procedure module. An implicit release of the TRID in step 616 and 617 may be controlled by a timer.

A TRID parameter indicating the TRID may added to an interface such as the S1 or S11 as a new IE or be defined as an extension of an existing IE. For some protocols it may also be possible to re-use an existing IE. The TRID parameter may also be provided together with an "Interface Type" identifier to indicate for what interface the TRID is valid.

An example of a TRID IE is shown below:

| Octets | Bits | | | | | | | |
|---|---|---|---|---|---|---|---|---|
| | 8 | 7 | 6 | 5 | 4 | 3 | 2 | 1 |
| 1 | Type | | | | | | | |
| 2 to 3 | Length = n | | | | | | | |
| 4 | Interface Type | | | | | | | |
| 6 to 9 | TRID | | | | | | | |

Wherein a first Octet of bits denoted Octet 1 indicates type of IE; octets 2 and 3 indicate Length, octet 4 indicates interface type and octets 6-9 comprise the TRID or TRID parameter.

In the example the "Interface Type" indicates type of interface, e.g. value 1 means S1 and value 2 means S11. The TRID is a 4 octet number in the example above. It should be noted that the above format is an example only. The TRID may also be included as an extension of existing Information Elements, e.g. as an extension of the TEID IE and/or as an extension to the UE S1AP ID. It should also be noted that the size of the sub-elements above could be defined differently. Furthermore, other fields of the IE, e.g. Type and Length, typically depend on in what interface/protocol the IE is provided, e.g. via GTP-C, S1AP etc. For GTP-C there is an existing Procedure Transaction ID (PTI) IE that may be re-used as TRID IE. Embodiments may also use a combination of several IEs for a TRID, e.g. TEID and PTI for GTP.

The embodiments herein may be implemented in systems for e.g. video distributions, web applications, gaming servers, industrial applications, etc. where it is desirable to bundle ongoing signalling procedures in herein disclosed ways, to avoid the need to store all context in a fixed processing board or VM, while at the same time be able to improve performance by handling messages related to a certain wireless device in the same processing module over an interval of a connection.

Figure 8:
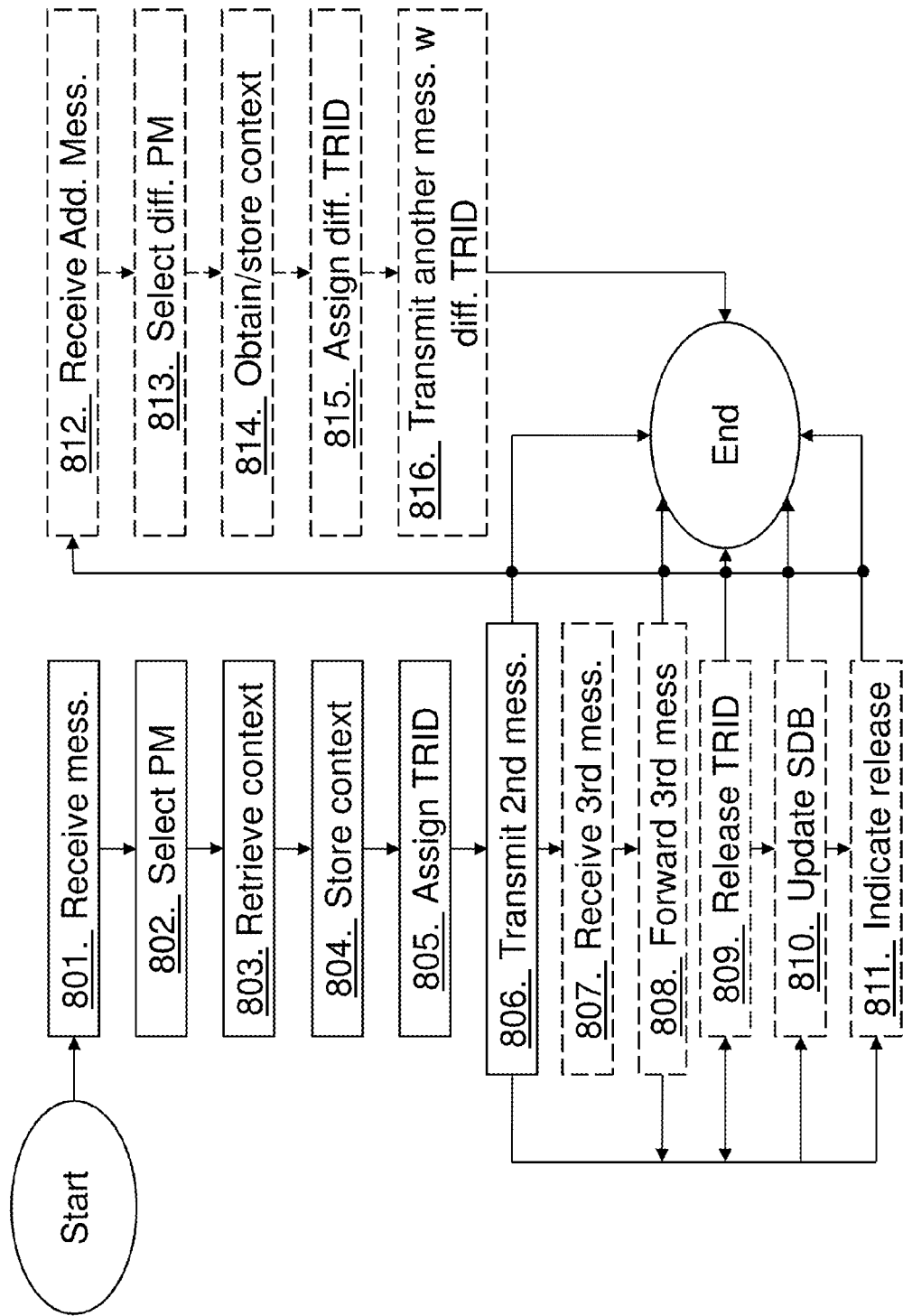
FIG. 8 shows a flowchart depicting a method performed in a first network node according to embodiments herein.

The method actions in the first network node, denoted 900 below and exemplified as MME 13 in the figures, for handling one or more signalling procedures of the wireless device 10 in the wireless communication network 1 according to some embodiments will now be described with reference to a flowchart depicted in FIG. 8. The first network node 900 comprises one or more processing modules for handling signalling procedures. The signalling procedure may be a connection establishment or a bearer establishment. The actions do not have to be taken in the order stated below, but may be taken in any suitable order. Actions performed in some embodiments are marked with dashed boxes.

Action 801. The first network node 900 receives a first message from a second network node, such as the radio base station 12 or the S-GW 14, indicating an initiation of a signalling procedure for the wireless device 10. The signalling procedure comprises one or more transactions between the first network node 900 and the second network node and/or another network node.

Action 802. The first network node 900 selects a processing module out of the one or more processing modules for handling the signalling procedure. The processing module may be a processing board and/or a virtual machine. This corresponds to action 502 in FIG. 5.

Action 803. The first network node 900 then retrieves context of the wireless device 10 from the session data base 42 and stores the context on the processing module. The session data base 42 may store or is configured to store one or more contexts of wireless devices for a session of a connection for the wireless device 10. The first network node 900 may indicate to the SDB 42 which context it wants to retrieve. The SDB 42 may be comprised in the first network node 900, or be an external unit and communication with the SDB 42 may be performed over a network connection. Exemplified above in action 503.

Action 804. The first network node 900 stores the retrieved context of the wireless device 10 on the processing module. Exemplified above in action 503.

Action 805. The first network node 900 assigns a TRID, to the signalling procedure, pointing to the selected processing module comprising the retrieved context of the wireless device 10. The TRID is valid or limited for an interval, which interval is defined by number of transactions, type of transaction and/or a time threshold. The processing module stores the context of the wireless device 10 during the interval. The TRID is limited for the signalling procedure being a part of the connection of the wireless device, or limited for the signalling procedure covering the interval, which interval is defined by number of transactions, type of transaction and/or a time threshold.

Exemplified above in action 504.

Action 806. The first network node 900 transmits a second message to the second network node and/or another network node, which second message is associated with the signalling procedure and comprises the assigned TRID. In some embodiments the second message further comprises another ID allocated for the connection and used as long as the connection exists, e.g. an MME UE S1AP ID or a GTP TEID. Exemplified above in actions 505*a* and 505*b*.

Action 807. The first network node 900 may receive from the second network node or the other network node, a third message associated with the signalling procedure and comprising the TRID from the second message. This third message may be a response to the second message.

Action 808. The first network node 900 may then forward, based on the TRID in the third message, the third message to the selected processing module for handling of the third message.

Action 809. The first network node 900 may release the TRID from the selected processing module and/or the retrieved context stored on the processing module when the interval ends, e.g. the signalling procedure ends, while the wireless device 10 is still being connected, e.g. to the first network node 900. Exemplified above in action 508.

Action 810. The first network node 900 may update in the session data base 42 the context to be associated with the selected processing module, e.g. indicates in the SDB 42 which processing module serves this wireless device 10. E.g. at a release also the context of the wireless device 10 in the SDB 42 is updated. Additionally or alternatively, the first network node 900 may update in the session data base 42 content of the context of the wireless device 10 in the session data base 42. Exemplified above in action 507.

Action 811. The first network node 900 may indicate, explicitly or implicitly, e.g. by not including TRID, a release of the TRID to the second network node and/or another network node when the interval ends. Exemplified above in actions 509a and 509b.

In some embodiments when the first network node 900 receives an additional message of a different signalling procedure for the wireless device 10 during the connection, the first network node 900 assigns a different TRID to a processing module and a context of the wireless device 10. The following procedure may be performed.

Action 812. The first network node 900 may receive the additional message of a different signalling procedure for the wireless device 10 during the connection. The additional message is not associated with the TRID.

Action 813. The first network node 900 may reselect the processing module or another processing module out of the one or more processing modules for handling the different signalling procedure.

Action 814. The first network node 900 may obtain the context of the wireless device 10 from the session data base 42 and store it on the reselected processing module.

Action 815. The first network node 900 may assign a different TRID to the reselected processing module and the obtained context of the wireless device 10 for a same or different interval.

Action 816. The first network node 900 may transmit another message to the second network node and/or the other network node, which other message is associated with the different signalling procedure and comprises the different TRID.

Figure 9:
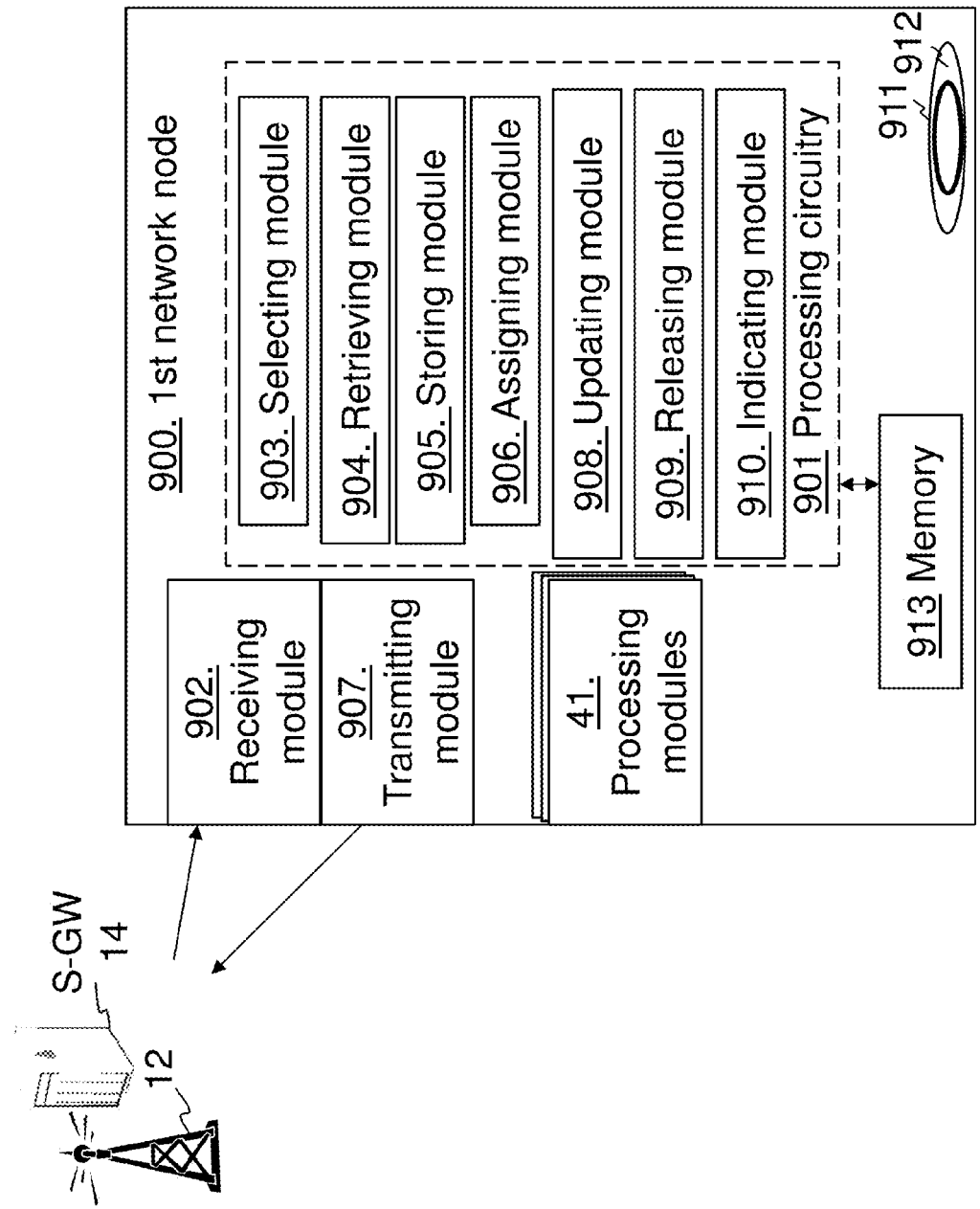
FIG. 9 shows a block diagram depicting a first network node according to embodiments herein.

FIG. 9 shows a block diagram depicting a first network node 900, such as the MME 13, for handling one or more signalling procedures of the wireless device 10 in the wireless communication network 1. The first network node 900 comprises one or more processing modules 41 for handling signalling procedures.

The first network node 900 is configured to receive a first message from the second network node 1100 indicating an initiation of a signalling procedure for the wireless device 10. The signalling procedure comprises one or more transactions between the first network node and the second network node and/or another network node. The first network node 900 is further configured to select a processing module out of the one or more processing modules for handling the signalling procedure. The first network node 900 is additionally configured to retrieve context of the wireless device 10 from the SDB 42 to the processing module. The first network node 900 is also configured to store the retrieved context of the wireless device 10 on the selected processing module. The first network node 900 is configured to assign a TRID to the signalling procedure, pointing to the selected processing module comprising the retrieved context of the wireless device 10. The TRID is valid for an interval, which interval is defined by number of transactions, type of transaction and/or a time threshold. The first network node 900 is also configured to transmit a second message to the second network node 1100 and/or another network node, which second message is associated with the signalling procedure and comprises the assigned TRID.

The first network node 900 may be configured to update in the SDB 42 the context to be associated with the selected processing module and/or content of the context of the wireless device 10 in the SDB 42. The first network node 900 may further be configured to release the TRID from the selected processing module and/or the retrieved context stored on the processing module when the interval ends while the wireless device 10 is still being connected.

The first network node 900 may further be configured to receive an additional message of a different signalling procedure for the wireless device during the connection, which additional message is not associated with the TRID. The first network node 900 may also be configured to reselect the processing module or another processing module out of the one or more processing modules for handling the different signalling procedure. The first network node 900 may be configured to obtain the context of the wireless device 10 from the SDB 42. The first network node 900 may additionally be configured to assign a different TRID to the reselected processing module and the obtained context of the wireless device 10 for a same or different interval. The first network node 900 may then be configured to transmit another message to the second network node 1100 and/or the other network node, which other message is associated with the different signalling procedure and comprises the different TRID.

The first network node 900 may further be configured to indicate a release of the TRID to the second network node and/or another network node when the interval ends. The signalling procedure may be a connection establishment or a bearer establishment.

The first network node 900 may further be configured to receive, from the second network node or the other network node, a third message associated with the signalling procedure and comprising the TRID from the second message. The first network node 900 may then be configured to forward, based on the TRID in the third message, the third message to the selected processing module for handling of the third message.

In some embodiments the first network node 900 may comprise processing circuitry 901, e.g. one or more processors. The first network node 900 may further comprise a receiving module 902. The processing circuitry 901, and/or the receiving module 902 may be configured to receive a first message from the second network node, such as the radio base station 12 or the S-GW 14, indicating an initiation of a signalling procedure for the wireless device 10, which signalling procedure comprises one or more transactions between the first network node and the second network node and/or another network node. The signalling procedure may be a connection establishment or a bearer establishment.

The first network node 900 may further comprise a selecting module 903. The processing circuitry 901, and/or the selecting module 903 may be configured select a processing module out of the one or more processing modules 41 for handling the signalling procedure.

The first network node 900 may further comprise a retrieving module 904. The processing circuitry 901, and/or the retrieving module 904 may be configured to retrieve context of the wireless device 10 from the session data base 42 to the processing module. The session data base 42 may store one or more contexts of wireless devices for a session of a connection for the wireless device 10.

The first network node 900 may further comprise a storing module 905. The processing circuitry 901, and/or the storing module 905 may be configured to store the retrieved context of the wireless device 10 on the selected processing module.

The first network node 900 may further comprise an assigning module 906. The processing circuitry 901, and/or the assigning module 906 may be configured to assign a TRID to the signalling procedure. The TRID is pointing to the selected processing module comprising the retrieved context of the wireless device 10, which TRID is valid for an interval. The interval is defined by number of transactions, type of transaction and/or a time threshold. In some embodiments when the first network node 900 is configured to receive an additional message of a different signalling procedure for the wireless device 10 during the connection, the first network node 900, the processing circuitry 901, and/or the assigning module 906 may be configured to assign a different TRID to a processing module and a context of the wireless device 10. The different TRID may be also be the same TRID.

The first network node 900 may further comprise a transmitting module 907. The processing circuitry 901, and/or the transmitting module 907 may be configured to transmit a second message to the second network node and/or another network node. The second message is associated with the signalling procedure and comprises the assigned TRID.

The first network node 900 may further comprise an updating module 908. The processing circuitry 901, and/or the updating module 908 may be configured to update in the session data base 42 the context to be associated with the selected processing module and/or content of the context of the wireless device 10 in the session data base 42.

The first network node 900 may further comprise a releasing module 909. The processing circuitry 901, and/or the releasing module 909 may be configured to release the TRID from the selected processing module and/or the retrieved context stored on the processing module when the interval ends while the wireless device 10 is still being connected.

In some embodiments, the processing circuitry 901, and/or the receiving module 902 may be configured to receive an additional message of a different signalling procedure for the wireless device 10 during the connection, which additional message is not associated with the TRID. The processing circuitry 901, and/or the selecting module 903 may be configured to reselect the processing module or another processing module out of the one or more processing modules for handling the different signalling procedure. The processing circuitry 901, and/or the retrieving module 904 may be configured to obtain the context of the wireless device 10 from the session data base 42. The processing circuitry 901, and/or the assigning module 906 may be configured to assign a different TRID to the reselected processing module and the obtained context of the wireless device 10 for a same or different interval. The processing circuitry 901, and/or the transmitting module 907 may be configured to transmit another message to the second network node and/or the other network node, which other message is associated with the different signalling procedure and comprises the different TRID.

The first network node 900 may further comprise an indicating module 910. The processing circuitry 901, and/or the indicating module 910 may be configured to indicate a release of the TRID to the second network node 1100 and/or another network node when the interval ends.

The processing circuitry 901, and/or the receiving module 902 may be configured to receive, from the second network node 1100 or the other network node, a third message associated with the signalling procedure and comprising the TRID from the second message. The processing circuitry 901, and/or the transmitting module 908 may be configured to forward, based on the TRID in the third message, the third message to the selected processing module for handling of the third message.

The methods according to the embodiments described herein for the first network node 900 are respectively implemented by means of e.g. a computer program 911 or a computer program product, comprising instructions, i.e., software code portions, which, when executed on at least one processor, e.g. the processing circuitry, cause the at least one processor to carry out the actions described herein, as performed by the first network node 900. The computer program 911 may be stored on a computer-readable storage medium 912, e.g. a disc or similar. The computer-readable storage medium 912, having stored thereon the computer program 911, may comprise the instructions which, when executed on at least one processor, cause the at least one processor to carry out the actions described herein, as performed by the first network node 900. In some embodiments, the computer-readable storage medium may be a non-transitory computer-readable storage medium. The first network node 900 may comprise a memory 913 configured to store TRIDs, contexts, data, applications to perform the methods herein and/or similar.

Figure 10:
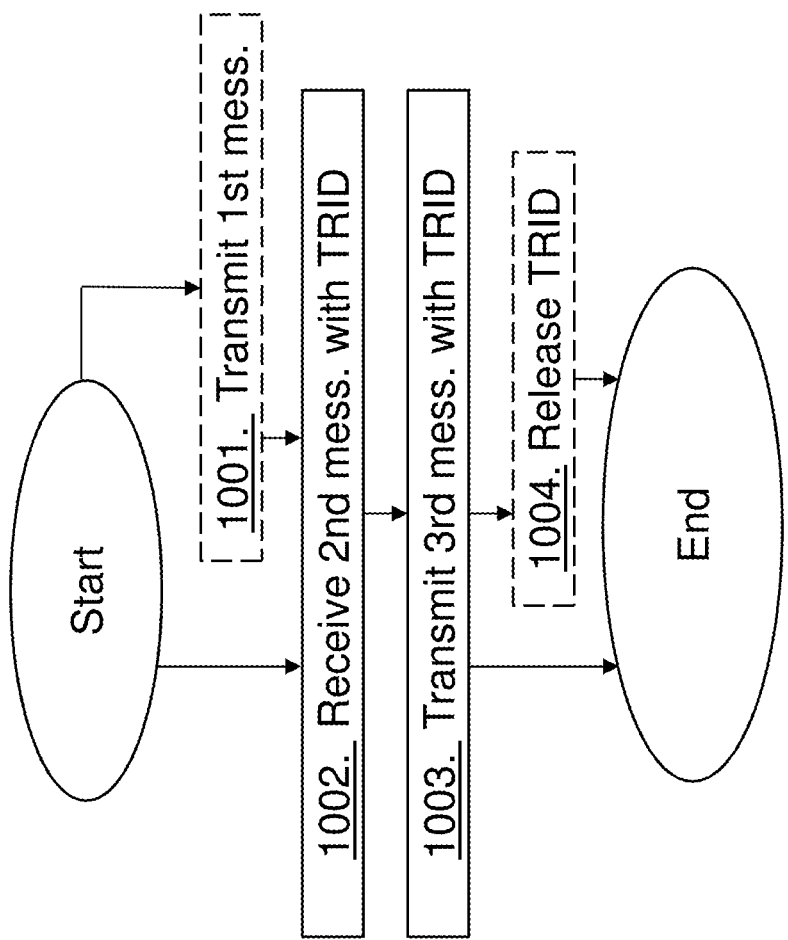
FIG. 10 shows a flowchart depicting a method performed in a second network node according to embodiments herein.

The method actions in a second network node 1100, exemplified as the radio base station 12 or the S-GW 14 in the figures, for handling a signalling procedure of the wireless device 10 in the wireless communication network 1 according to some embodiments will now be described with reference to a flowchart depicted in FIG. 10. The actions do not have to be taken in the order stated below, but may be taken in any suitable order. Actions performed in some embodiments are marked with dashed boxes. The signalling procedure is initiated by a first message transmitted to the first network node 900 and the signalling procedure comprises one or more transactions between the first network node 900 and the second network node 1100 and/or another network node.

Action 1001. The second network node 1100 may transmit to the first network node 900, the first message indicating an initiation of the signalling procedure for the wireless device 10. Exemplified above in actions 501a and 501b.

Action 1002. The second network node 1100 receives a second message from the first network node 900, which second message is associated with the signalling procedure and comprises a TRID. The TRID is used for an interval, which interval is defined by number of transactions, type of transaction and/or a time threshold.

Action 1003. The second network node 1100 transmits to the first network node 900 during or within the interval, a third message as a response to the second message, and which third message comprises the TRID. E.g. the second message maybe a request of the signalling procedure and the third message may be a response message of the signalling procedure. Exemplified above in actions 506a and 506b.

Action 1004. The second network node 1100 may release the TRID from the signalling procedure when the interval ends. The releasing may be performed when receiving an indication from the first network node 900. Exemplified above in actions 510a and 510b.

Figure 11:
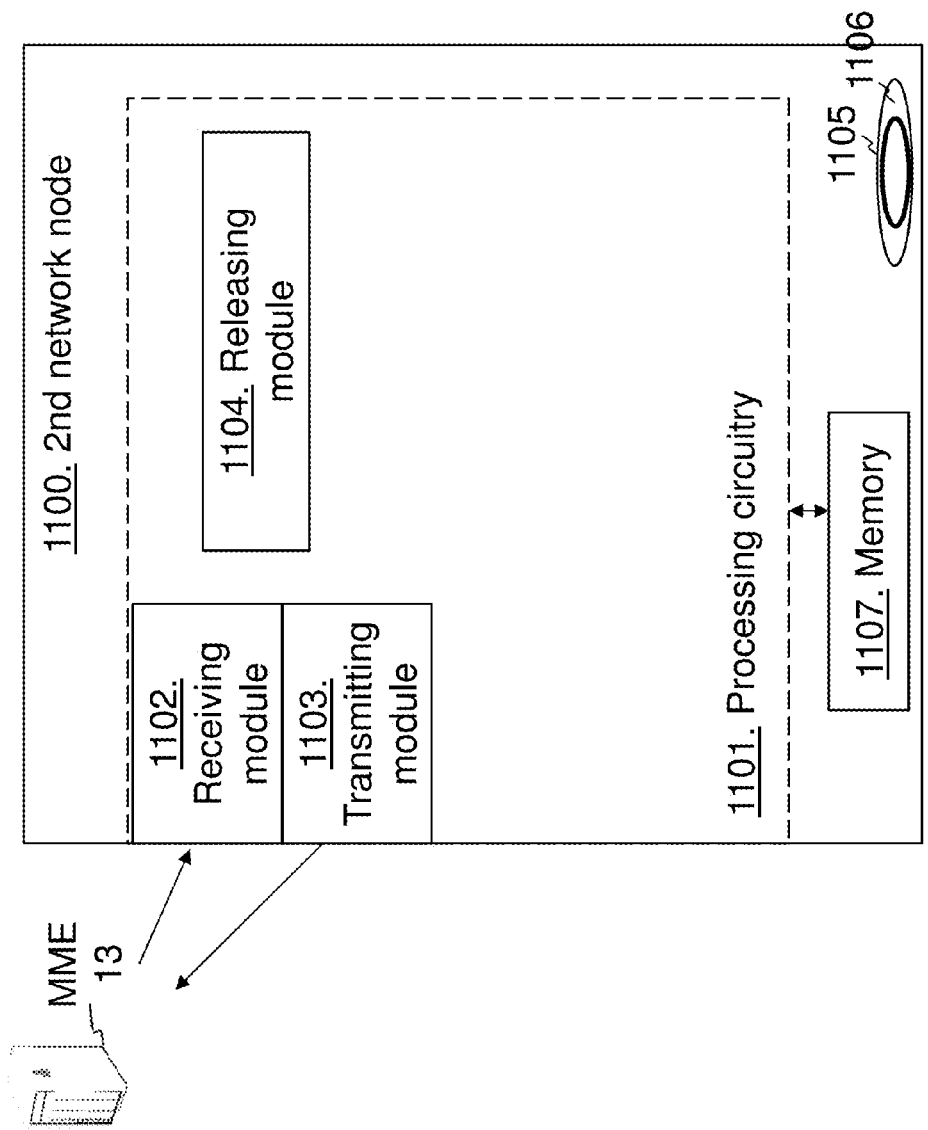
FIG. 11 shows a block diagram depicting a second network node according to embodiments herein.

FIG. 11 shows a block diagram depicting a second network node 1100, such as the S-GW 14 and/or the radio base station 12, for handling a signalling procedure of the wireless device 10 in the wireless communication network 1. The signalling procedure is initiated by a first message transmitted to the first network node 900 and the signalling procedure comprises one or more transactions between the first network node and the second network node and/or another network node.

The second network node 1100 is configured to receive a second message from the first network node 900, which second message is associated with the signalling procedure and comprises a TRID. The TRID is used for an interval, which interval is defined by number of transactions, type of transaction and/or a time threshold.

The second network node 1100 is configured to transmit to the first network node 900 within the interval, a third message as a response to the second message, and which third message comprises the TRID.

The second network node 1100 may further be configured to release the TRID from the signalling procedure when the interval ends.

The second network node 1100 may further be configured to release the TRID when receiving an indication from the first network node 900.

The second network node 1100 may further be configured to transmit to the first network node 900 the first message indicating an initiation of the signalling procedure for the wireless device 10.

The second network node 1100 may comprise processing circuitry 1101, e.g. one or more processors. The second network node 1100 may comprise a receiving module 1102. The processing circuitry 1101, and/or the receiving module 1102 may be configured to receive a second message from the first network node 90. The second message is associated with the signalling procedure and comprises the TRID, which TRID is used for an interval. The interval is defined by number of transactions, type of transaction and/or a time threshold.

The second network node 1100 may comprise a transmitting module 1103. The processing circuitry 1101, and/or the transmitting module 1103 may be configured to transmit to the first network node 13 during or within the interval, a third message as a response to the second message, and which third message comprises the TRID. The processing circuitry 1101, and/or the transmitting module 1103 may be configured to transmit to the first network node 13, the first message indicating an initiation of the signalling procedure for the wireless device 10.

The second network node 1100 may comprise a releasing module 1104. The processing circuitry 1101, and/or the releasing module 1104 may be configured to release the TRID from the signalling procedure when the interval ends. The processing circuitry 1101, and/or the releasing module 1104 may be configured to release the TRID when receiving an indication from the first network node 900.

The methods according to the embodiments described herein for the second network node 1100 are respectively implemented by means of e.g. a computer program 1105 or a computer program product, comprising instructions, i.e., software code portions, which, when executed on at least one processor, e.g. the processing circuitry, cause the at least one processor to carry out the actions described herein, as performed by the second network node 1100. The computer program 1105 may be stored on a computer-readable storage medium 1106, e.g. a disc or similar. The computer-readable storage medium 1106, having stored thereon the computer program 1105, may comprise the instructions which, when executed on at least one processor, cause the at least one processor to carry out the actions described herein, as performed by the second network node 1100. In some embodiments, the computer-readable storage medium may be a non-transitory computer-readable storage medium. The second network node 1100 may comprise a memory 1107 configured to store TRIDs, data, applications to perform the methods herein and/or similar.

As will be readily understood by those familiar with communications design, functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means/circuitry such as processor/s discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed in a first network node for handling one or more signalling procedures of a wireless device in a wireless communication network, wherein the first network node comprises one or more processing modules for handling signalling procedures; the method comprising:

receiving a first message from a second network node indicating an initiation of a signalling procedure for the wireless device, which signalling procedure comprises one or more transactions between the first network node and the second network node and/or another network node;

selecting a processing module out of the one or more processing modules for handling the signalling procedure;

retrieving context of the wireless device from a session data base to the processing module;

storing the retrieved context of the wireless device on the selected processing module;

assigning a temporary routing identity, TRID, to the signalling procedure, pointing to the selected processing module comprising the retrieved context of the wireless device, the TRID being valid for an interval, which interval is defined by number of transactions, type of transaction and/or a time threshold; and transmitting a second message to the second network node and/or another network node, which second message is associated with the signalling procedure and comprises the assigned TRID.

2. A method according to claim 1, further comprising updating in the session data base the context to be associated with the selected processing module and/or content of the context of the wireless device in the session data base.

3. A method according to claim 1, further comprising releasing the TRID from the selected processing module and/or the retrieved context stored on the processing module when the interval ends while the wireless device is still being connected.

4. A method according to claim 3, further comprising receiving an additional message of a different signalling procedure for the wireless device during the connection, which additional message is not associated with the TRID;

reselecting the processing module or another processing module out of the one or more processing modules for handling the different signalling procedure;

obtaining context of the wireless device from the session data base;

assigning a different TRID to the reselected processing module and the obtained context of the wireless device for a same or different interval; and transmitting another message to the second network node and/or the other network node, which other message is associated with the different signalling procedure and comprises the different TRID.

5. A method according to claim 1, further comprising indicating a release of the TRID to the second network node and/or another network node when the interval ends.

6. A method according to claim 1, wherein the signalling procedure is a connection establishment or a bearer establishment.

7. A method according to claim 1, further comprising receiving, from the second network node or the other network node, a third message associated with the signalling procedure and comprising the TRID from the second message; and forwarding, based on the TRID in the third message, the third message to the selected processing module for handling of the third message.

8. A method performed in a second network node for handling a signalling procedure of a wireless device in a wireless communication network, which signalling procedure is initiated by a first message transmitted to a first network node and the signalling procedure comprises one or more transactions between the first network node and the second network node and/or another network node; the method comprising receiving a second message from the first network node, which second message is associated with the signalling procedure and comprises a temporary routing identity, TRID, which TRID is used for an interval, which interval is defined by number of transactions, type of transaction and/or a time threshold; and transmitting to the first network node within the interval, a third message as a response to the second message, and which third message comprises the TRID.

9. A method according to claim 8, further comprising releasing the TRID from the signalling procedure when the interval ends.

10. A method according to claim 9, wherein the releasing is performed when receiving an indication from the first network node.

11. A method according to claim 8, further comprising transmitting to the first network node, the first message indicating an initiation of the signalling procedure for the wireless device.

12. A first network node for handling one or more signalling procedures of a wireless device in a wireless communication network, the first network node comprises one or more processing modules for handling signalling procedures; the first network node is configured to:

receive a first message from a second network node indicating an initiation of a signalling procedure for the wireless device, which signalling procedure comprises one or more transactions between the first network node and the second network node and/or another network node;

select a processing module out of the one or more processing modules for handling the signalling procedure;

retrieve context of the wireless device from a session data base to the processing module;

store the retrieved context of the wireless device on the selected processing module;

assign a temporary routing identity, TRID, to the signalling procedure, pointing to the selected processing module comprising the retrieved context of the wireless device, which TRID is valid for an interval, which interval is defined by number of transactions, type of transaction and/or a time threshold; and to transmit a second message to the second network node and/or another network node, which second message is associated with the signalling procedure and comprises the assigned TRID.

13. A first network node according to claim 12, further being configured to update in the session data base the context to be associated with the selected processing module and/or content of the context of the wireless device in the session data base.

14. A first network node according to claim 12, further being configured to release the TRID from the selected processing module and/or the retrieved context stored on the processing module when the interval ends while the wireless device is still being connected.

15. A first network node according to claim 14, further being configured to:

receive an additional message of a different signalling procedure for the wireless device during the connection, which additional message is not associated with the TRID;

reselect the processing module or another processing module out of the one or more processing modules for handling the different signalling procedure;

obtain the context of the wireless device from the session data base;

assign a different TRID to the reselected processing module and the obtained context of the wireless device for a same or different interval; and to transmit another message to the second network node and/or the other network node, which other message is associated with the different signalling procedure and comprises the different TRID.

16. A first network node according to claim 12, further being configured to indicate a release of the TRID to the second network node and/or another network node when the interval ends.

17. A first network node according to claim 12, wherein the signalling procedure is a connection establishment or a bearer establishment.

18. A first network node according to claim 12, further being configured to receive, from the second network node or the other network node, a third message associated with the signalling procedure and comprising the TRID from the second message; and to forward, based on the TRID in the third message, the third message to the selected processing module for handling of the third message.

19. A second network node for handling a signalling procedure of a wireless device in a wireless communication network, which signalling procedure is initiated by a first message transmitted to a first network node and the signalling procedure comprises one or more transactions between the first network node and the second network node and/or another network node; the second network node comprising one or more processing modules and being configured to:

receive a second message from the first network node, which second message is associated with the signalling procedure and comprises a temporary routing identity, TRID, which TRID is used for an interval, which interval is defined by number of transactions, type of transaction and/or a time threshold; and transmit to the first network node within the interval, a third message as a response to the second message, and which third message comprises the TRID.

20. A second network node according to claim 19, further being configured to release the TRID from the signalling procedure when the interval ends.

21. A second network node according to claim 20, further being configured to release the TRID when receiving an indication from the first network node.

22. A second network node according to claim 19, further being configured to transmit to the first network node, the first message indicating an initiation of the signalling procedure for the wireless device.

23. A non-transitory computer-readable storage medium comprising a computer program, which computer program comprises instructions which, when executed on at least one processor of a first network node for handling one or more signalling procedures of a wireless device in a wireless communication network, wherein the first network node comprises one or more processing modules for handling signalling procedures, cause the first network node to:

receive a first message from a second network node indicating an initiation of a signalling procedure for a wireless device; which signalling procedure comprises one or more transactions between the first network node and the second network node and/or another network node;

select a processing module out of the one or more processing modules for handling the signalling procedure;

retrieve context of the wireless device from a session data base to the processing module;

store the retrieved context of the wireless device on the selected processing module;

assign a temporary routing identity, TRID, to the signalling procedure, pointing to the selected processing module comprising the retrieved context of the wireless device, the TRID being valid for an interval, which interval is defined by number of transactions, type of transaction and/or a time threshold; and transmit a second message to the second network node and/or another network node, which second message is associated with the signalling procedure and comprises the assigned TRID.

24. A non-transitory computer-readable storage medium comprising a computer program, which computer program comprises instructions which, when executed on at least one processor of a second network node for handling a signalling procedure of a wireless device in a wireless communication network, which signalling procedure is initiated by a first message transmitted to a first network node and the signalling procedure comprises one or more transactions between the first network node and the second network node and/or another network node, cause the second network node to:

receive a second message from the first network node, which second message is associated with the signalling procedure and comprises a temporary routing identity, TRID, which TRID is used for an interval, which interval is defined by number of transactions, type of transaction and/or a time threshold; and transmit to the first network node within the interval, a third message as a response to the second message, and which third message comprises the TRID.

* * * * *